(12) United States Patent
Lütze et al.

(10) Patent No.: US 9,020,650 B2
(45) Date of Patent: Apr. 28, 2015

(54) UTILITY GRID, CONTROLLER, AND METHOD FOR CONTROLLING THE POWER GENERATION IN A UTILITY GRID

(75) Inventors: Hans Henning Lütze, Bad Bentheim (DE); Andreas Bücker, Hasbergen (DE)

(73) Assignee: General Electric Company, Schenectady, NY (US)

( * ) Notice: Subject to any disclaimer, the term of this patent is extended or adjusted under 35 U.S.C. 154(b) by 1030 days.

(21) Appl. No.: 11/674,199

(22) Filed: Feb. 13, 2007

(65) Prior Publication Data

US 2008/0195255 A1    Aug. 14, 2008

(51) Int. Cl.
*H02J 3/38* (2006.01)
*F03D 7/02* (2006.01)
*F03D 9/00* (2006.01)
*G06Q 30/02* (2012.01)

(52) U.S. Cl.
CPC .............. *F03D 7/0284* (2013.01); *F03D 9/003* (2013.01); *F05B 2250/36* (2013.01); *F05B 2270/337* (2013.01); *G06Q 30/0283* (2013.01); *Y02E 10/725* (2013.01); *Y02E 10/763* (2013.01); *Y02E 10/723* (2013.01); *Y04S 50/14* (2013.01); *H02J 3/383* (2013.01); *H02J 3/386* (2013.01); *Y02E 10/563* (2013.01); *H02J 3/382* (2013.01)

(58) Field of Classification Search
USPC ................ 700/286, 288, 295, 291; 290/44
See application file for complete search history.

(56) References Cited

U.S. PATENT DOCUMENTS

| | | | |
|---|---|---|---|
| 6,583,521 B1 * | 6/2003 | Lagod et al. | 307/70 |
| 2002/0084655 A1 | 7/2002 | Lof et al. | |
| 2003/0102675 A1 * | 6/2003 | Noethlichs | 290/44 |
| 2004/0030457 A1 * | 2/2004 | Bayoumi et al. | 700/286 |
| 2004/0098142 A1 * | 5/2004 | Warren et al. | 700/22 |
| 2006/0171086 A1 | 8/2006 | Hennessy et al. | |
| 2006/0279088 A1 * | 12/2006 | Miller et al. | 290/44 |

FOREIGN PATENT DOCUMENTS

| | | | |
|---|---|---|---|
| EP | 1739824 A | 1/2007 | |
| WO | WO 2006/032685 A | 3/2006 | |

OTHER PUBLICATIONS

European Patent Office Examiner's Communication issued in connection with corresponding EP Application No. 08101499.5 on Jul. 14, 2008.

* cited by examiner

*Primary Examiner* — Sean Shechtman
*Assistant Examiner* — Steven Garland
(74) *Attorney, Agent, or Firm* — Global Patent Operation; Douglas D. Zhang

(57) ABSTRACT

A utility grid is provided, the utility grid including a centralized controller; an intermittent renewable energy source for generating electrical power; at least one further power generation system; and a local controller for controlling the total power output of the intermittent renewable energy source and the at least one further power generation system, wherein the centralized controller is connected with the local controller and adapted to request a desired total power output from the local controller.

14 Claims, 9 Drawing Sheets

UTILITY GRID, CONTROLLER, AND METHOD FOR CONTROLLING THE POWER GENERATION IN A UTILITY GRID

BACKGROUND OF THE INVENTION

The present invention relates to a utility grid, a controller, and a method for controlling the power generation in a utility grid.

Wind energy is often used to generate electrical power at power plants, often referred to as wind farms, using, for example, the rotation of large wind turbines to drive electrical generators. However, because wind speed and air density change over time, power output from the generators of a wind farm may also change over time, sometimes even falling to zero when wind speed drops below a minimum threshold. Variations in power output from such wind farms may cause variations not only in an amount of power flowing from the farm but also in the frequency of a power system to which the electrical power is delivered for consumption thereof. A group of power systems, power plants, and associated infrastructure spread over a geographical area is sometimes referred to as a grid. A drop in power output from the wind farm can cause a deficiency in power delivered to a local area of a grid of which the wind farm is within, as well as power delivered to other areas of the grid. Typically, a power output of one or more other power plants within the grid is adjusted to compensate for a change in the power output from the wind farm. Accordingly, a size of the wind farm relative to a local demand for power, sometimes referred to as a load demand, relative to a load demand of other areas of the grid, and/or relative to an overall load demand of the grid may influence the impact of the variable power output of the wind farm on other plants in the grid. For example, when power output from the wind farm falls to zero due to low wind, another plant within the grid may meet the total load demand of a region of the grid local to the wind farm. Such other power plants are typically plants that generate electrical power from coal, steam, a combustible fluid, water, and/or solar energy but may also include, but are not limited to, gas turbine power stations, nuclear power plants, or even other wind farms.

Typically, a grid includes a plurality of power generation systems which are spread over a geographic area. The grid also includes systems that consume power (sometimes referred to herein as "power systems") as well as infrastructure of the grid, such as, but not limited to infrastructure for interconnection, control, maintenance, and/or improvement of the power generation systems, the power systems, and/or any infrastructure of the grid. For example, the grid may include electrical transmission lines interconnecting the power generation systems, power systems within the grid, any infrastructure within the grid, and/or any combination thereof. Typically, the grid includes a centralized control system operatively connected to the power generation systems for controlling a power output of each of the power generation systems, for example, using processing logic. Typically, the centralized control system is operated by the network operator. The power output of the power generation systems controlled by the centralized control system may include, but is not limited to an amount of electrical power, a frequency of electrical power generated, and/or a rate of change of the amount and/or the frequency of electrical power.

The power generation systems may, for example, each serve a geographic region within the grid by delivering electrical power to such regions. The power generation systems may each include any type of power source. For example, the power generation system may include a power source that generates electrical power at least partially from coal, steam, water, a combustible fluid such as gasoline, natural gas, diesel fuel, etc., and/or solar energy. Additionally, the power generation systems may include a nuclear power source, a gas turbine power station, and/or a wind farm.

BRIEF DESCRIPTION OF THE INVENTION

In view of the above, a utility grid is provided, the utility grid includes a centralized control means; an intermittent renewable energy source for generating electrical power; at least one further power generation system; and at least one local controller for controlling the total power output of said intermittent renewable energy source and said at least one further power generation systems, wherein the centralized control means is connected with the at least one local controller and adapted to request a desired total power output from the local controller.

Further aspects, advantages and features of the present invention are apparent from the dependent claims, the description and the accompanying drawings.

According to a first aspect, an electric network structure includes a central network controller, a non-dispatchable energy source for generating electrical power, at least one other power generation system, and at least one supervisory controller for controlling the total power output of said non-dispatchable energy source and said at least one other power generation system, wherein the central network controller is coupled to the at least one supervisory controller and adapted to demand a desired feed-in power from the supervisory controller.

According to a further aspect a controller for controlling the output power of an intermittent renewable energy source is provided. The controller includes at least one forecasting means providing at least one forecasting variable, wherein the controller is adapted to control the power output at least partially based on at least one forecasting variable selected from the group consisting of: a weather forecast, a storm warning, wind speed, air density, irradiance, atmospheric turbulence, rain condition, snow condition, air temperature, humidity, a dispatch schedule.

According to another aspect a method of controlling the power generation in a utility grid is provided. The method includes the steps of transmitting a desired total power output from a centralized grid control center to a local controller; generating electrical power using at least one intermittent renewable energy source; generating electrical power using at least one other power source; and controlling the power output of said at least one intermittent renewable energy source and said at least one other power source so that the total power output of the at least one intermittent renewable energy source and the at least one other power source is substantially equal to the desired total power output.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
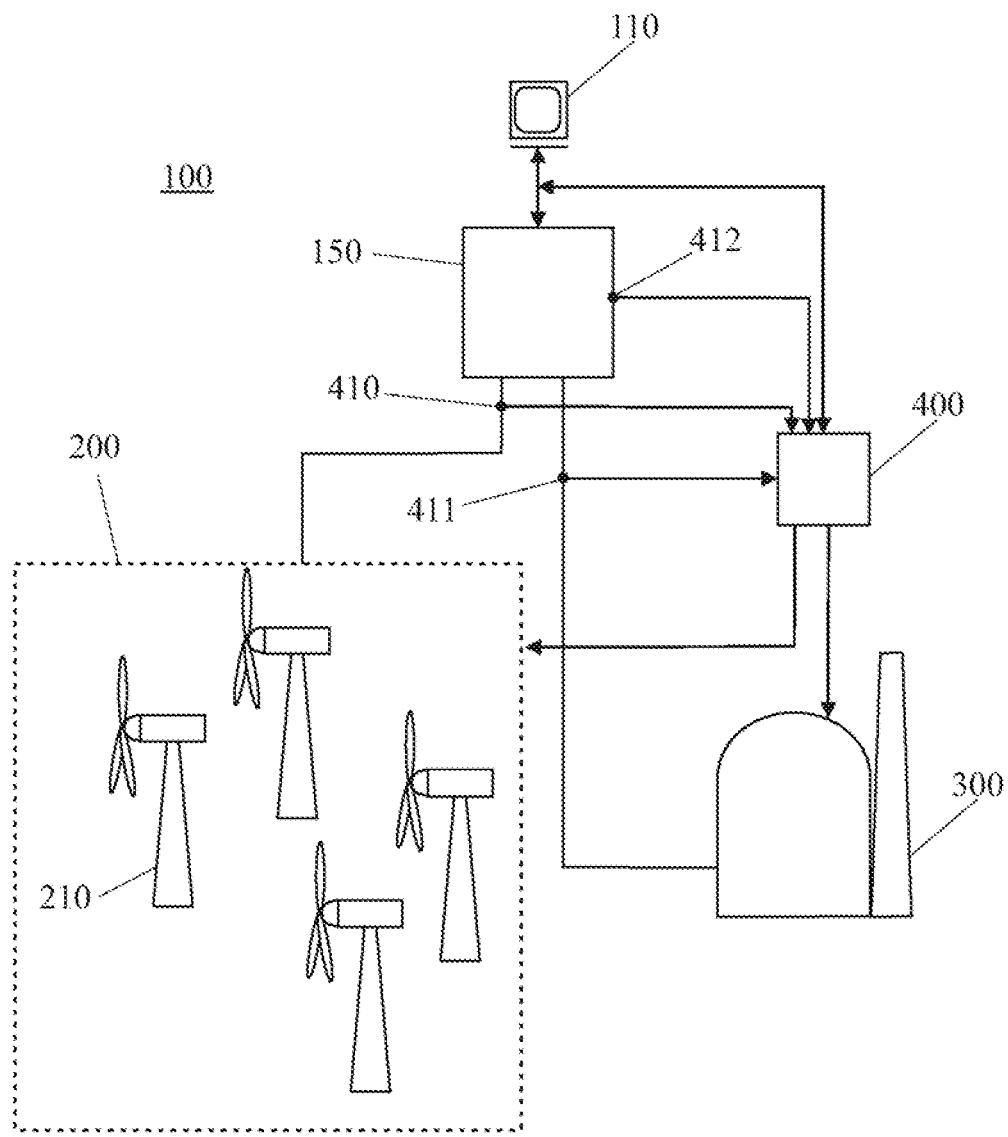
FIG. 1 shows a schematic representation of a utility grid according to an embodiment, of the present invention.

FIG. 1 shows a schematic representation of a utility grid according to an embodiment of the present invention. Therein, the utility grid 100 includes a centralized grid control 110 which monitors and controls power production and power consumption within the grid, grid frequency or the like. In FIG. 1, only part of the grid is shown in detail while most of the network structure is schematically represented by reference numeral 150. It will be understood by those skilled in the art that this part of the grid may include a plurality of power lines, power generation systems, power consumers and the like. However, the detailed structure of this part of the utility grid is not essential for understanding the principles underlying the present invention and has, therefore, been omitted.

Utility grid 100 further includes an intermittent renewable energy source 200. In the embodiment of FIG. 1, intermittent renewable energy source 200 is shown as a plurality of wind turbines 210, also called a wind park or a wind farm. However, it will be understood by those skilled in the art that intermittent renewable energy source 200 may also include a single wind turbine 210 connected to grid 100 and/or a solar power plant. In the following, the intermittent renewable energy source will be exemplified by means of a wind power system without limiting the scope of the invention thereto. It will be understood by those skilled in the art that any other energy source exhibiting intermittent power generation behavior, i.e. a fluctuating behavior that is non-dispatchable or only dispatchable to a small degree, may be used as the intermittent power source without deviating from the scope of the present invention. Further to wind power system 200, utility grid 100 includes a further power generation system 300. The at least one further power generation system 300 may be any of a coal-fired power plant, a steam plant, a combustible fluid plant, a hydropower plant, a gas turbine power station, a biogas plant, a nuclear power plant or any other power generation system. Further to power generation systems, in addition or alternatively a power storage plant or device allowing for dispatchable power supply may be used as power system 300. Furthermore, it will be understood by those skilled in the art that a plurality of further power generation systems 300 may be provided instead of only a single one without deviating from the scope of the present invention. Wind power system 200 and the at least one further power generation system 300 are configured to generate electrical power and are adapted for feeding said electrical power into utility grid 100.

Furthermore, utility grid 100 includes a local controller 400 which is adapted to control the total power output of wind power system 200 and the at least one further power generation system 300 as is indicated by the arrows. Typically, local controller 400 is realized as a programmable microcontroller but may be alternatively realized by any other suitable hardware or software solution, e.g. fixed logic control device circuit In contrast to centralized grid control 110, local controller is only adapted to control its local power generation systems 200 and 300 but is not connected to more remote areas of the grid. Furthermore, local controller is adapted to control the total output power of wind power system 200 and the at least one further power generation system 300 not being a wind power system. Thus, local controller 400 is adapted to control the total amount of electrical power fed into utility grid 100 by wind power system 200 and further power plant 300. It will be understood by those skilled in the art that the term "total power output" includes both active and reactive power. Accordingly, centralized grid control 110 may also demand a certain amount of reactive power flow to be provided by power generation systems 200 and 300. In this event, local controller 400 adjusts the power generation systems 200, 300 to provide a sufficient amount of reactive power flow. It will be further understood by those skilled in the art that it is not required that local controller 400 itself directly controls wind power system 200 and power plant 300. Rather, wind power system 200 and power plant 300 may have their own individual control systems like, e.g., a wind turbine controller. However, local controller 400 may command a specific output power to each of wind power system 200 and power plant 300. Furthermore, local controller 400 is connected with centralized control 110. Centralized grid control 110 is adapted to request a desired total output power of wind power system 200 and power plant 300 from local controller 400. However, centralized grid control 110 is not itself connected to wind power system 200 and power plant 300. Accordingly, wind power system 200 and power plant 300 are controlled only via local controller 400. Local controller 400 may be configured to accept real-time signals from centralized grid control 110. Thus, local controller 400 may participate in dynamic dispatch and automatic generation control (ACG), which is a standard-type function of dynamic regulation of the grid frequency.

Thus, the application of one or more local controllers 400 facilitates control of the utility grid 100. In particular, centralized grid control 110 can rely on the demanded total power output which is provided due to the control of local controller 400. Typically, the power output of wind power system 200 will be highly fluctuating due to varying wind speed or other reasons. If such a wind power system 200 is part of the local power generation infrastructure, the feed-in power of this local power generation infrastructure will also fluctuate due to the amount of fluctuating wind power. However, local controller 400 controls the other, e.g. conventional, power plants 300 in the local infrastructure so that the desired total output power is fed into utility grid 100. Thus, the intermittent power source and the dispatchable power source, e.g. a wind farm and a gas turbine, act like a single entity under the control of local controller 400. For example, local controller 400 may be adapted to control the total output power of wind power system 200 and power plant 300 to be substantially constant, e.g. equal to the desired total power output requested by centralized control 110. In another embodiment, local controller 400 may be adapted to control the total output power of wind power system 200 and power plant 300 to vary only within a predetermined range, i.e. to stay within a predetermined band. For example, the range may be determined by centralized control 110 and transmitted to local controller 400. In a further embodiment, local controller 400 may be adapted to control the total output power of wind power system 200 and power plant 300 to vary according to a predetermined schedule. For example, the schedule may be determined by centralized control 110 and transmitted to local controller 400. The schedule may take into account times of day of large power consumption, e.g. mornings and lunch time, and times of low power consumption, e.g. during nighttime. Due to the above control strategies that could be implemented in local controller 400, the statistical probability of power generated by wind power system 200 is considerably increased and may, for example, allow for permanent reduction of fossil or nuclear power generation. Furthermore, stability problems of grid 100 during serious weather conditions, e.g. storms, can be reduced since wind power production can be locally backed-up by power plant 300.

Typically, local controller 400 is a closed-loop regulator which controls the power output at least partially based on at least one variable indicative of the present condition of utility grid 100. Therefore, local controller 400 is typically connected with at least one sensor for measuring at least one grid variable, so that control can be at least partially based on the at least one grid variable measured by said sensor. Typically, the at least one grid variable is selected from the group consisting of: active power, reactive power, power output of intermittent renewable energy source, power output of alternate power generation system, current, voltage, frequency, power factor, rate of change of power. In the embodiment of FIG. 1, local controller 400 is connected with a sensor 410 for sensing the power output of wind power system 200, a further sensor 411 for sensing the power output of power plant 300, and a sensor 412 for measuring grid frequency. However, it will be understood by those skilled in the art that, sensors 410, 411, 412 may measure one or more of any of the aforementioned grid variables. Furthermore, local controller 400 may be provided with additional grid sensors for measuring additional grid variables.

Figure 2:
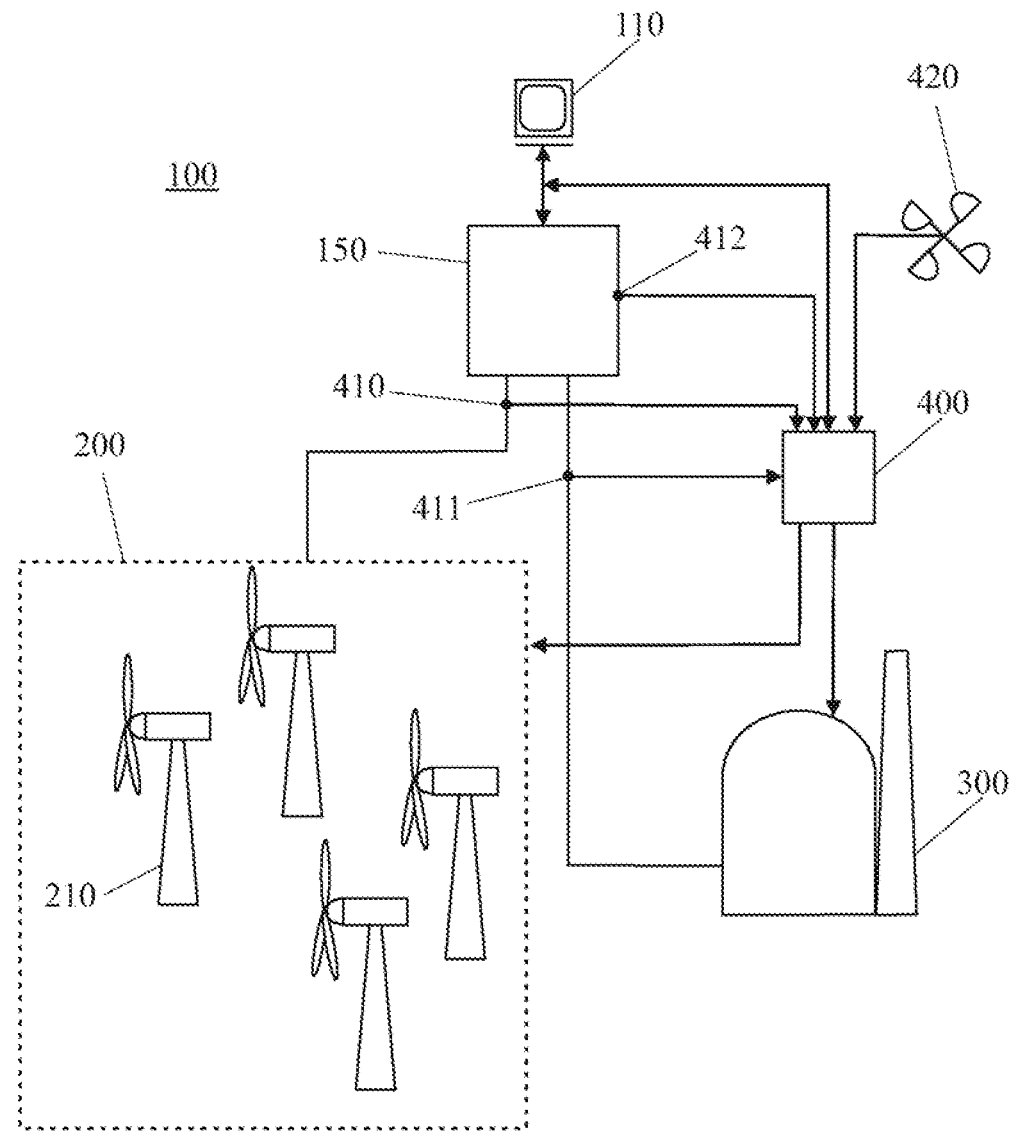
FIG. 2 shows a schematic representation of a utility grid according to a further embodiment of the present invention.

FIG. 2 shows a schematic representation of a utility grid 100 according to a further embodiment of the present invention. The basic configuration of utility grid 100 is similar to the grid shown in FIG. 1. However, local controller 400 is connected with at least one sensor 420 indicative of at least one environmental condition. The local controller 400 is adapted to control the total power output at least partially based on the at least one environmental condition measured by sensor 420. Typical environmental conditions monitored by sensor 420 include wind speed, air density, irradiance, atmospheric turbulence, rain condition, snow condition, air temperature, and humidity. Accordingly, sensor 420 may include an anemometer, an air densimeter, a hygrometer, a thermometer, a rain sensor, a snow sensor, a turbulence sensor and the like. Since the power output of wind power system 200 strongly depends on the environmental, in particular the atmospheric conditions, the accuracy of control by local controller 400 can be improved by taking into account the environmental conditions determining the power output of wind power system 200. For example, local controller 400 may increase the power output of power plant 300 if an anemometer 420 measures a decrease in wind speed. Thus, the total power output of wind power system 200 and power plant 300 can be maintained at a constant level although the output of wind power system 200 drops due to the calm.

Figure 3:
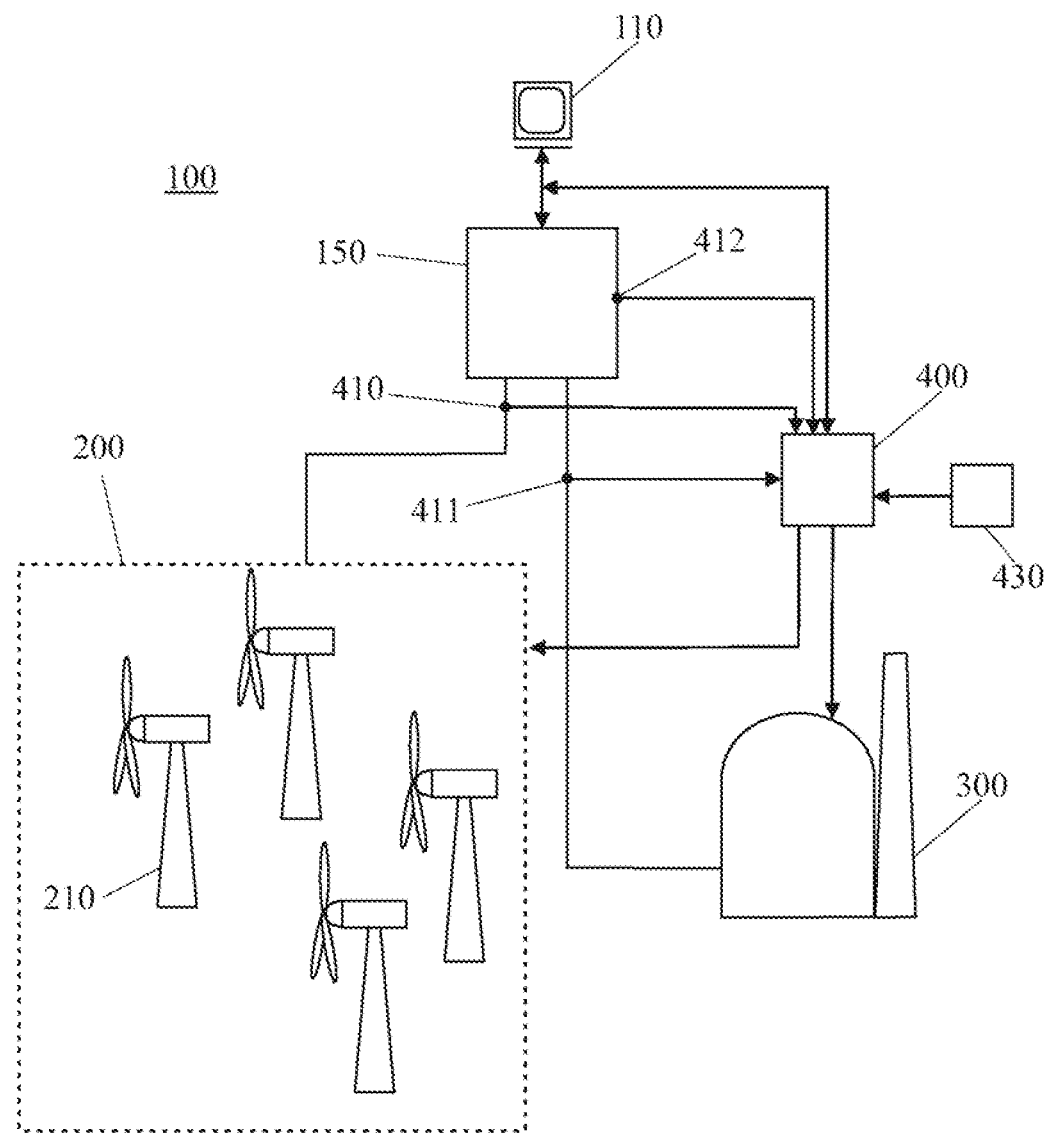
FIG. 3 shows a schematic representation of a utility grid according to another embodiment of the present invention.

FIG. 3 shows a schematic representation of a utility grid according to another embodiment of the present invention. The basic configuration of utility grid 100 is similar to the grid shown in FIG. 1. However, local controller 400 is connected with at least one forecasting means 430 providing at least one forecasting variable. Local controller 400 is adapted to control the total power output at least partially based on the at least one forecasting variable provided by forecasting means 430. Typical forecasting variables predicted by forecasting means 430 include a weather forecast a storm warning, wind speed, air density, irradiance, atmospheric turbulence, rain condition, snow condition, air temperature, humidity, and a dispatch schedule. Accordingly, forecasting means 430 may include a meteorological service. Thus, local controller 400 may anticipate the future weather conditions at the wind power site 200 within a predetermined forecast horizon. In particular, local controller 400 may determine a plurality of meteorological scenarios weighted with different probabilities. Since the power output of wind power system 200 strongly depends on the weather conditions at the wind power site, the accuracy of control by local controller 400 can be improved by taking into account future weather conditions governing the future power output of wind power system 200. For example, forecast means 430 may report a storm warning for a storm occurring with a probability of 95% within the next 2 hours at the wind power site 200. Then, local controller 400 may shut down wind turbines 210 in the wind farm before the storm arrives at the wind farm site. Simultaneously, local controller 400 may increase the power output of a conventional power plant 300. Thus, the total power output of wind power system 200 and power plant 300 can be maintained at a constant level or, at least, within a predetermined range although the output of wind power system 200 drops to zero due to the turbine shut-down.

Figure 4:
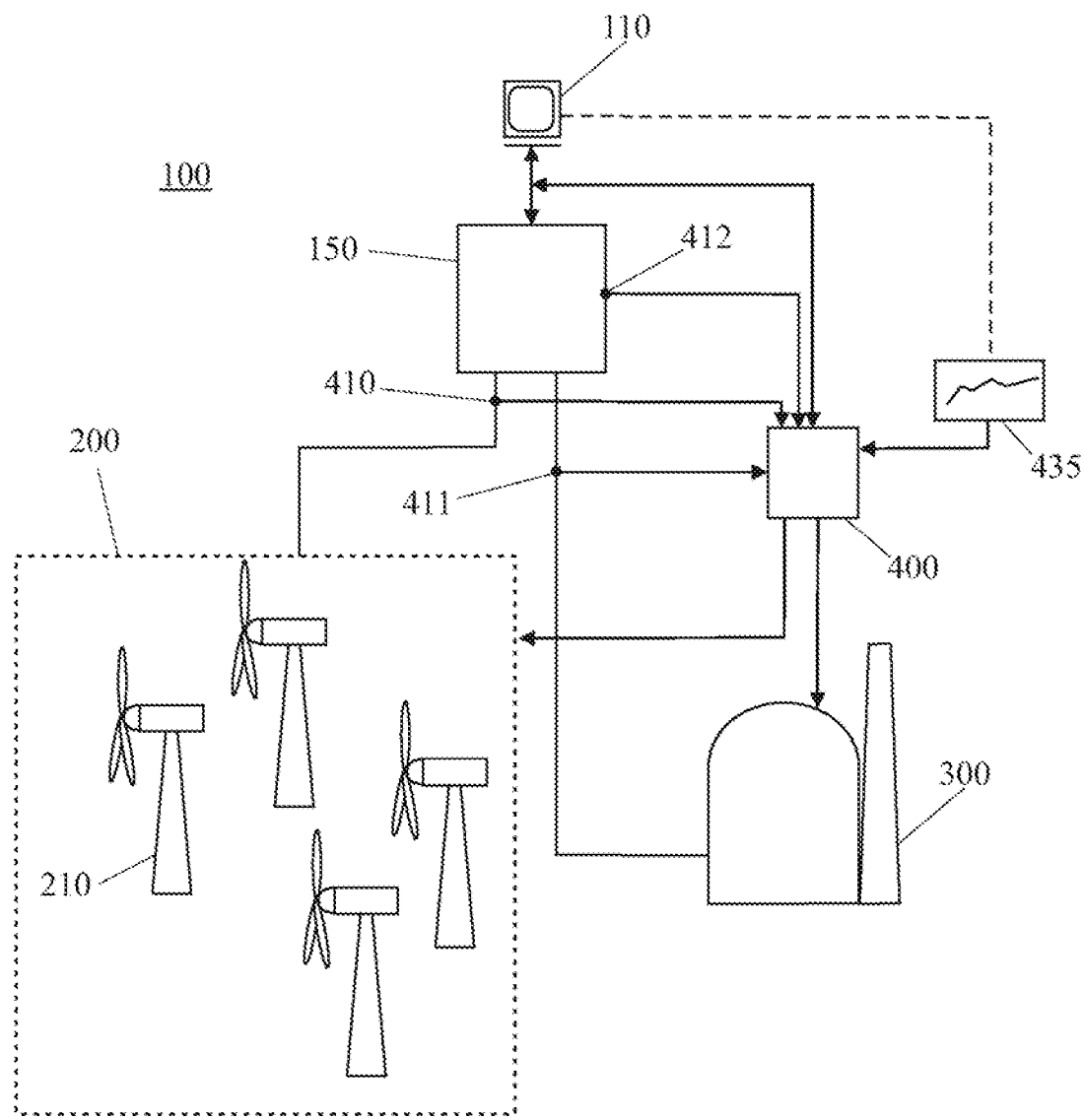
FIG. 4 shows a schematic representation of a utility grid according to an even further embodiment of the present invention.

In still another embodiment shown in FIG. 4, local controller 400 is connected with at least one economic efficiency means 435. Economic efficiency means 435 provides at least one economic efficiency variable, which is typically selected from the group consisting of: a cost of operation, a fuel price, a market price of electrical energy, or a power transmission fee. The local controller 400 is adapted to control the total power output at least partially based on the economic efficiency variable provided by economic efficiency means 435. Thus, local controller 400 may decide to reduce/increase or shut-down/start-up power generators also on the basis of economic factors. For example, the fuel price for diesel may be higher than that for gas. In this event, local controller 400 may decide to shut down a diesel engine instead of a gas turbine. Furthermore, local controller 400 may decide to store energy instead of feeding it into the grid if the current marketprice for electric power is not attractive. Finally, it should be understood that economic information may be provided to local controller 400 either by a separate economic efficiency means 435 or via centralized grid control 110 (as indicated by the dashed line). Of course, profit can be increased by applying also economic considerations to the operation of local controller 400.

Figure 7:
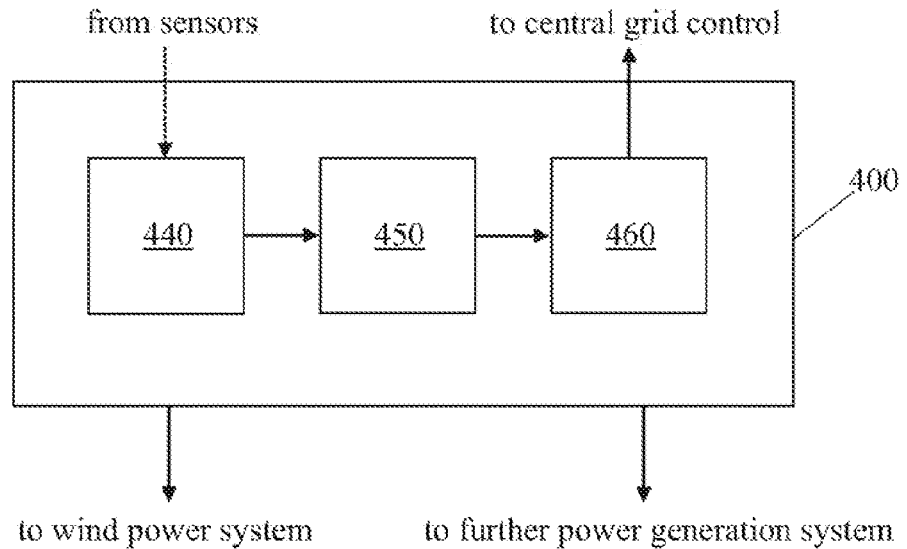
FIG. 7 shows a schematic representation of a local controller according to an embodiment of the present invention.

In another embodiment shown in FIG. 7, a forecasting means 440 is integrated in local controller 400. Integrated forecasting means 440 receives input from external sensors and/or an external forecasting means 430. Integrated forecasting means 440 is adapted to provide a forecast within a predetermined forecasting horizon as described above based on the information received. Local controller 400 further includes a total power output estimation means 450 adapted to estimate the total power output within the predetermined forecasting horizon. For example, output estimation means 450 may simulate the power output of wind power system 200 based on a weather forecast. Furthermore, estimation means 450 may determine from the estimated power output whether a desired total power output requested by centralized grid control 110 can be generated by wind power system 200 and power plant 300 within the forecast horizon. Typically, local controller 400 comprises also a reporting means 460 adapted to report to the centralized grid control 110 whether or not the desired total power output can be generated within the forecasting horizon. Furthermore, reporting means 460 is also adapted to report the estimated total power output determined by estimation means 450 to centralized gild control 130. Thus, die central grid control 110 is informed by local controller 400 of the prospective total power output and can schedule countermeasures if necessary. For example, power production may be increased in another part of grid 150 if wind power system 200 must be completely shut-down during a storm and power plant 300 has not sufficient maximum power to maintain the desired total output power. Thus, the accuracy of control by local controller 400 can be improved by taking into account, weather forecasts or other forecasts governing die future power output of wind power system 200. Furthermore, also a dispatch schedule may be taken into account by forecasting means 440 so that the power demand within a predetermined forecasting horizon is considered. Also, this may improve the accuracy of control by local controller 400 since, for example, grid frequency will drop when large loads or a large number of smaller loads are connected to the grid within a short period of time. For example, there exists a large power demand during morning hours and at lunch time whereas considerably less power is demanded during nighttime.

Figure 5:
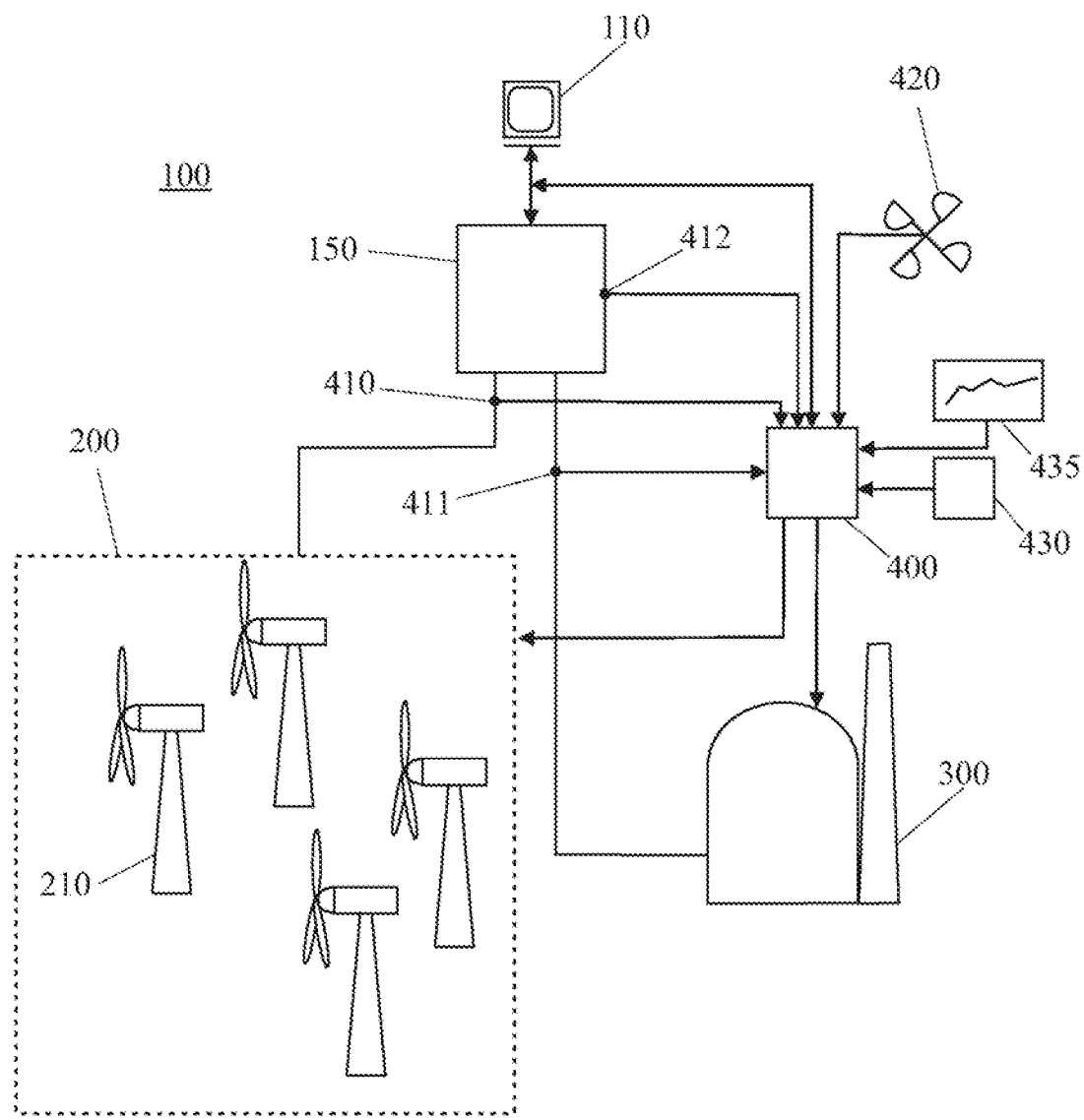
FIG. 5 shows a schematic representation of a utility grid according to still a further embodiment of the present invention.

FIG. 5 shows a schematic representation of a utility grid according to an even further embodiment of the present invention. The basic configuration of utility grid 100 is similar to the grid shown in FIG. 1 but local controller 400 is connected with a sensor 420 for environmental conditions, a forecasting means 430, and economic efficiency means 435. Thus taking into account actual and future conditions for intermittent renewable power generation as well as economic factors, the accuracy and efficiency of control by local controller 400 can be further improved.

Figure 6:
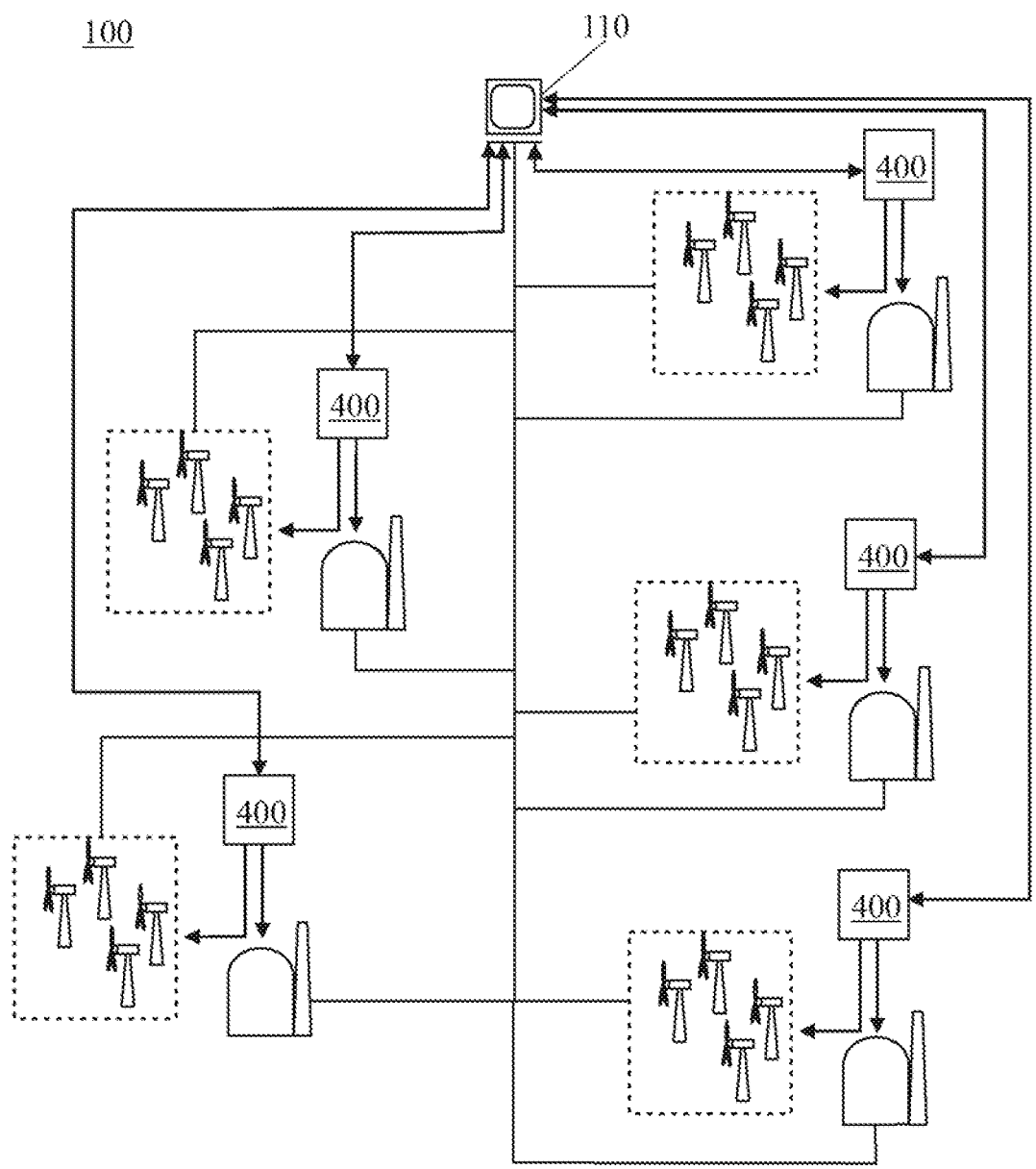
FIG. 6 shows a schematic representation of utility grid according to still a further embodiment of the present invention.

FIG. 6 shows a schematic representation of utility grid according to still a further embodiment of the present, invention. Therein, utility grid 100 includes several intermittent power generation systems and alternate dispatchable power plants grouped into regional clusters. The intermittent power generation systems and the other power plants are connected to utility grid 100, e.g., by power lines. Furthermore, loads (not shown) like factories, private households etc. are connected to the grid and are supplied with electrical power therefrom. Each of the regional power production clusters is controlled by a local controller 400 as described above. Furthermore, each of the local controllers 400 is connected with centralized grid control 110. Thus, centralized grid control 110 controls the power production within grid 100 via local controllers 400. Instead of directly controlling the wind farms and power plants, centralized control 110 only sends requests for desired total power output to each of local controllers 400.

Then, local controllers 400 have to provide the demanded power output or to report that the requested power output cannot be provided due to weather conditions, weather forecast etc. Optionally, local controllers 400 may provide an estimated power production schedule to centralized control 110 so that centralized control 110 can take countermeasures if one or more of local controllers 400 cannot provide their desired total power output. Thus, utility grid 110 has a hierarchical structure which delegates the control and stability of total power output to local controllers 400. Since the local controllers 400 can react to regional weather conditions and may even take into account weather forecasts, the stability of the grid can be maintained even for high wind power grid penetration.

Figure 8:
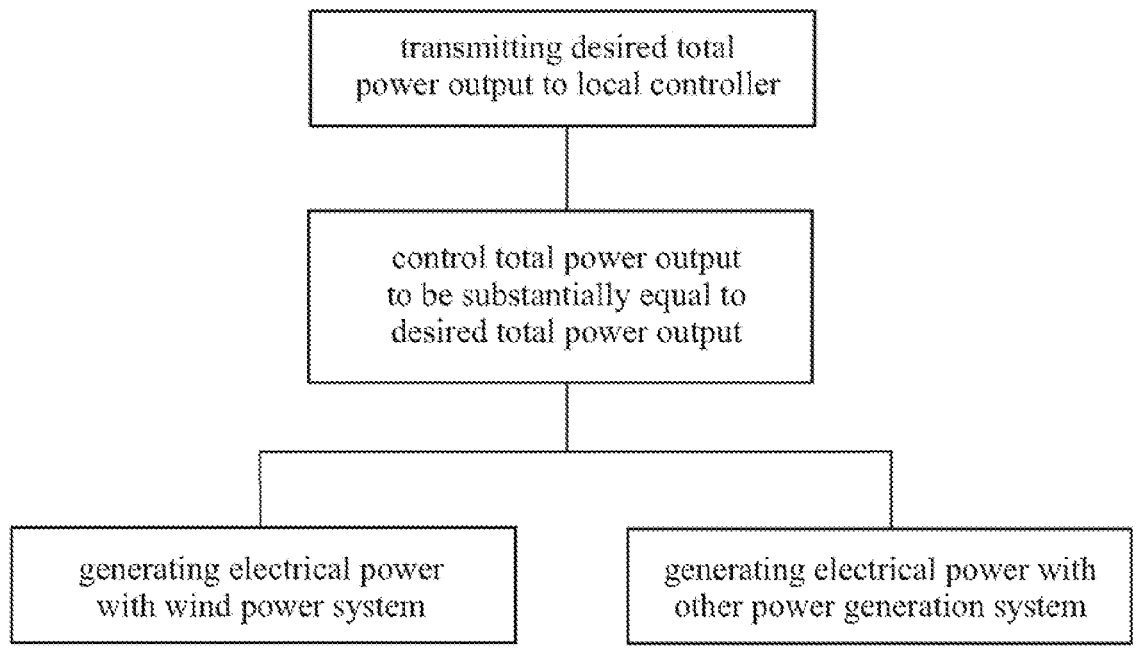
FIG. 8 shows a flow diagram according to an embodiment of the present invention.

FIG. 8 shows a flow diagram according to an embodiment of the present invention. In a first step, a desired total power output is transmitted from a centralized grid control center to a local controller. The desired total power output may be a constant value or a range within the total output power may vary. Next, the power output of the at least one wind power source and the at least one other power source is controlled by the local controller so that the total power output of the at least one intermittent power source and the at least one other power source is substantially equal to the desired total power output. In this embodiment, electrical power is generated by at least one wind power source and at least one other power source. In one embodiment, the step of controlling the total power output includes estimating a total power production within a predetermined forecast period, and determining whether said estimated total power production is sufficient for providing the desired total power output within said forecast period. If the desired total power output cannot be provided, this is reported to the centralized grid control. Optionally, also the information that the desired total output value can be generated may be reported to the centralized control. According to a further embodiment, at least one forecasting variable is obtained, and the total, power output is estimated at least partially based on the at least one forecasting variable. Typically, the forecasting variable includes a weather forecast, a storm warning, wind speed, air density, atmospheric turbulence, rain condition, snow condition, air temperature, humidity, or a dispatch schedule. In one even further embodiment of the present invention, an estimated total power output schedule for the forecast period is reported to the centralized control. Thus, the centralized control can schedule power production within the grid.

Figure 9:
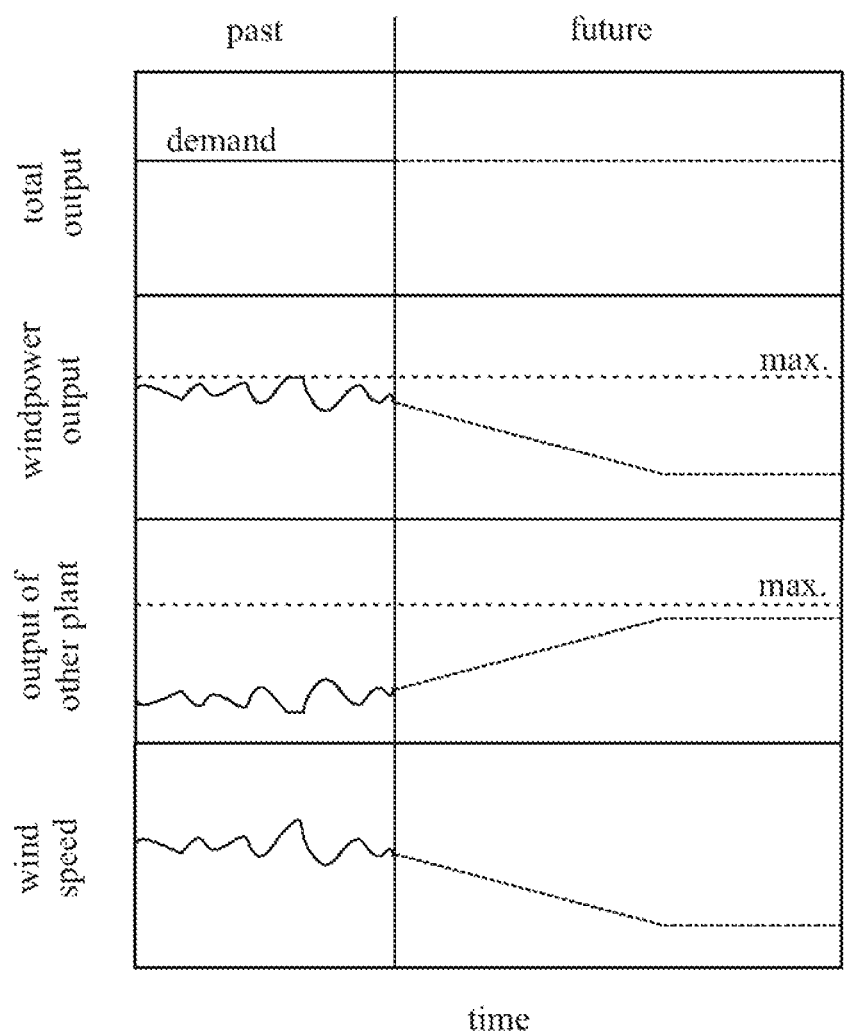
FIG. 9 shows the variation of power output over time in a first condition when the total output power is controlled with a method according to an embodiment of the present invention.

FIG. 9 shows the variation of power output over time in a first condition when the total output power is controlled with a method according to an embodiment of the present invention. In the embodiment shown in FIG. 9, a desired total output power requested by a centralized control is constant over time. However, wind speed has been fluctuating so that the power output from a wind power system also fluctuated, accordingly. It will be understood by those skilled in the art that there exists a maximum power output of the wind power system so that the output power will never exceed this limit even for higher wind speeds. Another power plant within the regional cluster is controlled by a local controller to supplement the power production by the wind power system so that a substantially constant total output power can be maintained. However, forecast data suggest a calm within the near future so that average wind speed will decrease. Therefore, also the estimated power output by the wind power system will decrease according to the wind speed. As a result, the output power of the other power plant must be increased to maintain the requested desired total output power. As can be seen from FIG. 9, it is still possible to maintain the desired total output power although the power output by the wind system decreases.

Figure 10:
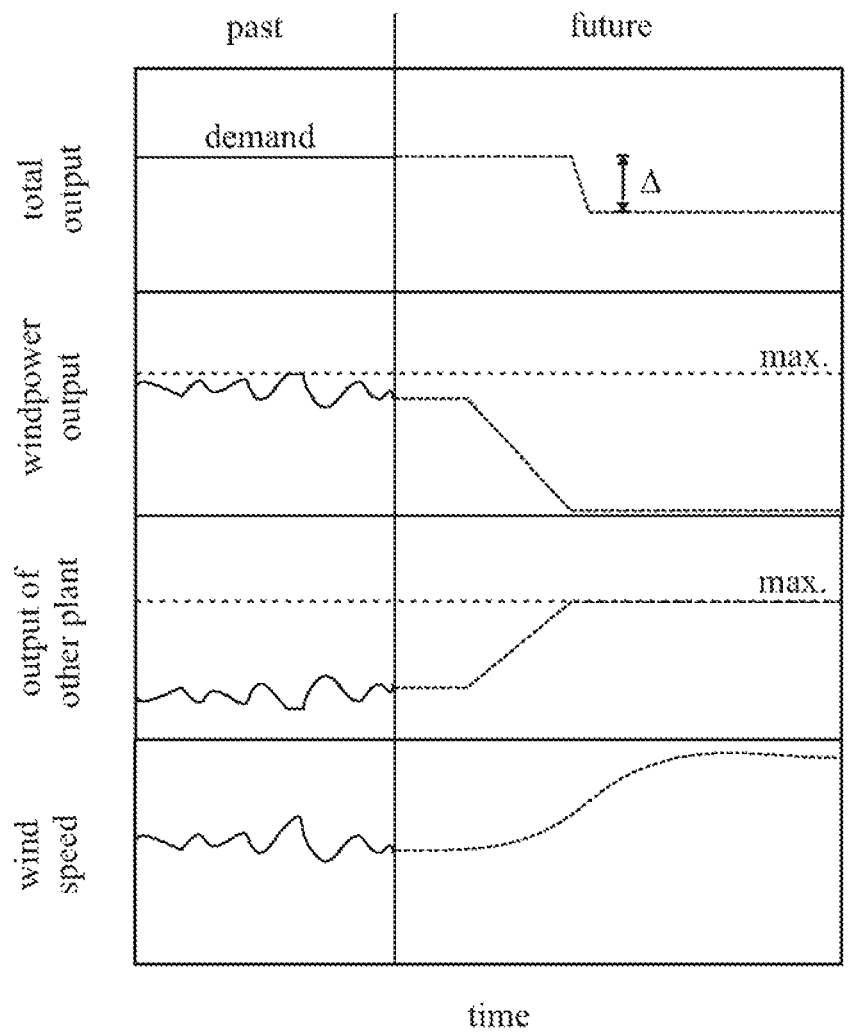
FIG. 10 shows the variation of power output over time in a second condition when the total output power is controlled with a method according to an embodiment of the present invention.

FIG. 10 shows the variation of power output over time in a second condition when the total output power is controlled with a method according to an embodiment of the present invention. Here, also a constant total output power is requested by the central grid control. However, a storm warning is reported by the forecasting means, resulting in a considerable increase of wind speed. The wind speeds during the storm will be too high for the wind turbines to operate so that they have to be shut down before the storm arrives at the wind power site. Accordingly, the estimated wind power output drops to zero for this wind power site. Similar to the example shown in FIG. 9, the power output of the other power plant is increased when the wind power output is reduced. However, it is shown that even with maximum power output from the other power plant the desired total power output cannot be attained. Rather, the total output power drops to the power output of the other power plant Therefore, a power gap Δ between the requested desired total power output and the actual possible output power during the storm exists. This power gap Δ has to be closed by increased power production of other power generation systems in the grid. However, due to the forecasting capability of the local controller the power gap can be anticipated well ahead of time. Thus, it is possible to increase power generation early enough even for slowly reacting power plants like coal-fired plants.

It will be understood by those skilled in the art that the present invention increases the statistical confidence in stability of wind power penetrated utility grids. Thus, conventional nuclear and/or coal fired power plants may be reduced without jeopardizing grid stability and/or sufficient power supply. Also, including weather forecasts and actual weather conditions increases predictability of wind power production. The hierarchical structure of die grid having local controllers increases reliability since control is based on local and/or regional data. Furthermore, centralized grid control is facilitated since it can be based on guaranteed local power output, values while the details of the control can be delegated to the local controllers.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other, in particular, wind power systems and solar power systems may be synonymously used in the context of the present invention as they both represent intermittent energy sources. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A utility grid serving a plurality of geographical regions, the utility grid comprising:
    a plurality of intermittent renewable power sources for generating electrical power, each of the intermittent, renewable power sources being associated with at least one respective further power generation system to serve a respective geographical region of the geographical regions within the utility grid, and a local controller configured to control the total local power output of the respective intermittent renewable power source and the at least one respective further power generation system, wherein each of the local controllers comprises a forecasting device and a total local power output estimator configured to estimate a total local power output within a predetermined forecasting horizon, wherein each of the intermittent renewable power sources and the at least one respective further power generation system are of different types; and
    a centralized control connected with the local controllers and configured to request a respective desired total local power output from each of the local controllers, and take a countermeasure in response to an indication that at least one of the local controllers is unable to provide the respective desired local power output within the predetermined forecasting horizon.

2. The utility grid according to claim 1, wherein each intermittent renewable power source includes at least; one of a wind power system and a solar power system.

3. The utility grid according to claim 1, wherein the at least one respective further power generation system is a dispatchable system selected from the group consisting of a coal-fired power plant, a steam plant, a combustible fluid plant, a hydropower plant, a gas turbine power station, a biogas plant, a nuclear power plant, a power storage plant or device and any combination thereof.

4. The utility grid according to claim 1, wherein each of the local controllers is adapted for controlling the respective total local power output to vary according to a schedule prescribed by the centralized control.

5. The utility grid according to claim 1, wherein each of the local controllers is adapted for controlling the respective total local power output to be within a predetermined range or to be substantially constant.

6. The utility grid according to claim 1, Wherein each of the local controllers is connected with at least one sensor adapted for measuring at least one grid variable selected from the group consisting of: active power, reactive power, power output of the plurality of intermittent renewable power sources, power output of alternate power generation system, current, voltage, frequency, power factor, and rate of change of power, and wherein the local controller is adapted to control the respective total local power output at least partially based on the at least one grid variable.

7. The utility grid according to claim 1, wherein each of the local controllers is connected with at least one sensor indicative of at least one environmental condition selected from the group consisting of: wind, speed, air density, irradiance, atmospheric turbulence, rain condition, snow condition, air temperature, and humidity, and wherein the local controller is adapted to control the respective total local power output at least partially based on the at least one environmental condition.

8. The utility grid according to claim 7, wherein the forecasting device is configured to provide a forecasting variable which is selected from the group consisting of: a weather forecast, a storm warning, wind speed, irradiance, air density, atmospheric turbulence, rain condition, snow condition, air temperature, humidity, and a dispatch schedule, and wherein each of the local controllers is configured to control the respective total local power output at least partially based on the forecasting variable.

9. The utility grid according to claim 8, wherein the predetermined forecasting horizon is based on the at least one forecasting variable.

10. The utility grid according to claim 9, wherein each of the local controllers comprises:
a reporting device adapted to report to the centralized control at least one of: whether a respective desired total power output can be generated by the respective intermittent renewable power source and the at least one respective further power generation system, and the respective estimated total local power output within the predetermined forecasting horizon.

11. The utility grid according to claim 1, wherein the local controller is configured to adjust respective total local power output of the respective intermittent renewable power source and the at least one respective further power generation system at least partially based on at least one economic efficiency variable, and wherein the at least one economic efficiency variable is selected from the group consisting of: a cost of operation, a fuel price, a market price of electrical energy, and a power transmission fee.

12. A method of controlling power generation in a utility grid serving a plurality of geographical regions, the method comprising the steps of:
transmitting a desired total power output from a centralized grid control to a local controller;
generating electrical power for one of the geographical regions within the utility grid using an intermittent renewable power source;
generating electrical power for the one of the geographical regions using at least one respective other power source, wherein the intermittent renewable power source and the at least one respective other power source are of different types;
controlling the total local power output of the intermittent renewable power source and the at least one respective other power source so that the total local power output of the intermittent renewable power source and the at least one respective other power source is substantially equal to the desired total local power output;
estimating a total local power production within a predetermined forecast period;
determining whether the estimated total local power production is sufficient for providing the desired total local power output within the predetermined forecast period; and
in response to a determination that the desired total local power output cannot be provided, reporting to the centralized grid control that the desired total local power output cannot be provided within the predetermined forecast period.

13. The method according to claim 12, wherein, in the estimation step, at least one forecasting variable is obtained, and wherein the total local power output is estimated at least partially based on the at least one forecasting variable selected from the group consisting of: a weather forecast, a storm warning, wind speed, air density, irradiance, atmospheric turbulence, rain condition, snow condition, air temperature, humidity, and a dispatch schedule.

14. The method according, to claim 12, wherein the reporting step comprises providing to the centralized grid control an estimated total local power output schedule for the predetermined forecast period.

* * * * *